UNITED STATES PATENT OFFICE.

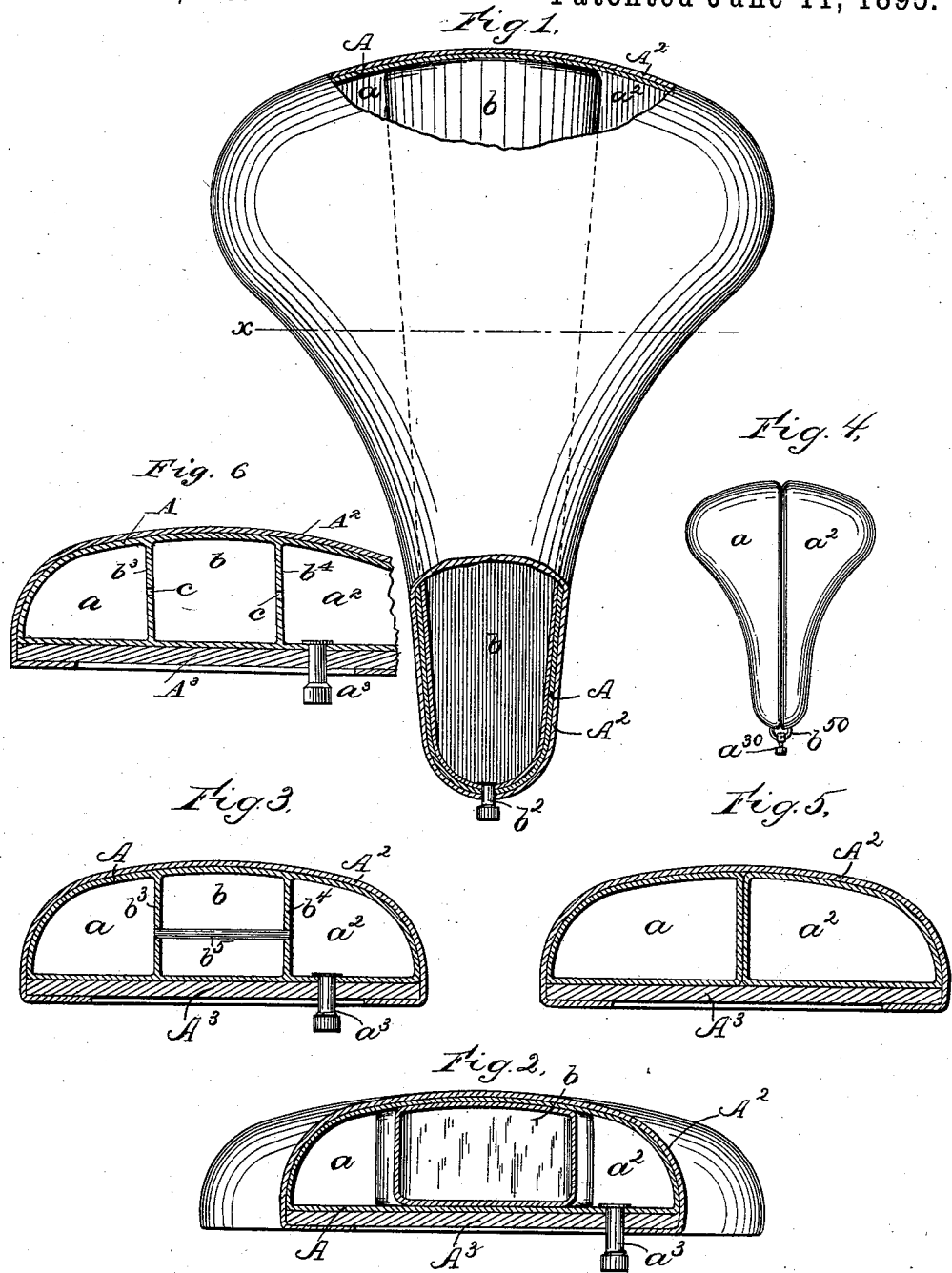

WARREN H. CRAIG, OF LAWRENCE, MASSACHUSETTS.

PNEUMATIC BICYCLE-SADDLE.

SPECIFICATION forming part of Letters Patent No. 540,725, dated June 11, 1895.

Application filed December 15, 1894. Serial No. 531,872. (No model.)

*To all whom it may concern:*

Be it known that I, WARREN H. CRAIG, of Lawrence, county of Essex, State of Massachusetts, have invented an Improvement in Pneumatic Bicycle-Saddles, of which the following description, in connection with the accompanying drawings, is a specification, like letters on the drawings representing like parts.

The present invention relates to bicycle saddles and is embodied in an improved pneumatic cushion or saddle, the object of the invention being to provide such a cushion in which the resiliency shall be maintained substantially equal on both sides of the saddle, regardless of the position of the rider. Pneumatic saddles have been heretofore constructed which consist of a single air-chamber of substantially the shape of an ordinary leather bicycle saddle, and when this construction is used if the weight of the rider comes more on one side of the saddle than on the other as may frequently happen in the use thereof, it is obvious that the air will be pressed out from the side where the most weight comes and into the side where there is the least weight and consequently the least need of a cushion, thus making a shifting unsteady seat. It has also been proposed to use two separate pneumatic cushions one on each side of the longitudinal axis of the saddle, but this form is also objectionable because it is obviously difficult to inflate the said separate cushions to the same degree or to keep them thus inflated so that one is likely to be harder than the other thus making a permanently uneven seat. It is also necessary in this case to provide two valves instead of one, thus adding to the expense of construction.

The present invention aims to obviate these difficulties and saddles embodying the invention may be made in various forms, the essential feature being embodied in a construction in which air chambers are provided on opposite sides of the longitudinal axis of the saddle; there being however, a restricted communication between the said chambers, thus insuring substantially equal pressure in both; it being impossible however, for the air to suddenly shift from one to the other, when the saddle is in use. The chambers thus having a restricted or pressure equalizing communication may be inflated through a single inlet provided with a suitable valve.

Figure 1 is a top plan view, partly in section, of one form of bicycle-saddle embodying my invention. Fig. 2 is a sectional view on line $x$, Fig. 1. Fig. 3 is a sectional view of a modification of the form shown in Fig. 1; Fig. 4, a top plan view of a somewhat-differently-constructed saddle embodying the same invention, but having the outer casing or covering removed; and Fig. 5 is a somewhat-enlarged sectional view of Fig. 4, with the outer covering added. Fig. 6 is a view similar to Fig. 3, but substituting holes $c\ c$ in the walls $b^3\ b^4$ for the tubes $b^5$, part of the right-hand side being broken away, so as to come within the drawing-sight.

Referring to Fig. 2, the saddle consists of an air tight bag or case A of suitable shape which is preferably provided with an outer covering $A^2$, of soft leather or other material adapted for the purpose, which may be secured to a base piece or support $A^3$ of suitable construction. The said base piece $A^3$ may be mounted in any of the ordinary ways upon a spring or frame adapted to be secured to the seat-post of the bicycle as usually constructed. The said case A is divided longitudinally into two chambers $a$ and $a^2$ by means of an inflatable tube $b$ within the said chamber and secured at its ends to the inner walls of the said chamber at the ends thereof respectively. In order to inflate the case A, a valve $a^3$ of any suitable construction is provided while the inflatable tube $b$ is also provided with a valve $b^2$.

In inflating this form of saddle the main case A is preferably inflated first while the dividing tube $b$ is allowed to remain deflated, the air thus having access to all parts of the said case A insuring substantially equal pressure throughout. The tube $b$ is then inflated as shown in Fig. 2 the air pressure bringing the top of said tube into conjunction with the top inner wall of the case A thus practically cutting off the communication between the chambers $a$ and $a^2$. It is not intended that the said tube $b$ shall be subjected to pressure sufficient to prevent entirely the communication between the chambers, there being naturally some slight leakage between the top of the saddle tube and the wall of the case A sufficient to equalize any difference in pressure which may exist between the two chambers $a$ and $a^2$. It is obvious, however, that there can be no sudden shifting of pressure from one of said chambers to the other, due to a sudden shifting of the weight of the rider from one side of the saddle to the other so that an equality of pressure is substantially maintained while the saddle is in use.

The tube $b$ may if desired be constructed as shown in Fig. 3, in which case the top and bottom walls of the chamber $a$ form also the top and bottom walls of the said tube $b$ which is completed by the side walls $b^3$, $b^4$, extending from the top to the bottom of the case A and preferably formed integral therewith. In this case, the communication between the two chambers $a$ and $a^2$ is through a tube or tubes $b^5$ extending through the tube $b$ from one side to the other thereof. In this case, as before, the chambers $a$, $a^2$, may be inflated through a single valve the tubes $b^5$ being of sufficient size to allow air to flow slowly from one chamber to the other thus equalizing the pressure therein but being at the same time sufficiently restricted to prevent any sudden flow of air from one of the said chambers to the other.

The tube or tubes $b^5$ might if desired, be omitted, small openings $c$, $c$, see Fig. 6, being provided in this case in the walls $b^3$, $b^4$, thus forming three chambers, having restricted communication with each other, and capable of being inflated through one valve.

As shown in Figs. 4 and 5, the chambers $a$ and $a^2$ consist of separate bags or cases connected together by means of a tube $b^{50}$ which is preferably as shown at the front end of the saddle and provided with a valve $a^{30}$ through which air may of course be admitted to both said chambers. The bags forming the said chambers are of such shape as to form when placed side by side as shown in Fig. 4, a cushion of suitable shape for use in connection with bicycles, and may then be provided with a suitable cover $A^2$, Fig. 5, and mounted on the supporting base.

It is not intended to limit the invention to the specific forms herein shown and described, as modifications might obviously be made without departing from the principle involved.

I claim—

1. A bicycle saddle having an outer casing, combined with two independent air chambers, one at each side of the longitudinal median line of the saddle, the said air chambers intercommunicating by means of a restricted air passage, substantially as described.

2. A bicycle saddle comprising a main inflatable receptacle and an auxiliary inflatable receptacle within said main receptacle extending from one end to the other thereof and thereby forming two chambers in said main receptacle one on each side of the said auxiliary receptacle, substantially as and for the purpose set forth.

In testimony whereof I have signed my name to this specification in the presence of two subscribing witnesses.

WARREN H. CRAIG.

Witnesses:
H. J. LIVERMORE,
M. E. HILL.